US012725429B2

(12) United States Patent
Kawashima

(10) Patent No.: US 12,725,429 B2
(45) Date of Patent: Sep. 1, 2026

(54) ANOMALY DETECTION DEVICE, ANOMALY DETECTION METHOD, AND COMPUTER PROGRAM FOR DETECTING ANOMALIES

(71) Applicant: TOYOTA JIDOSHA KABUSHIKI KAISHA, Toyota (JP)

(72) Inventor: Wataru Kawashima, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 18/375,579

(22) Filed: Oct. 2, 2023

(65) Prior Publication Data

US 2024/0135726 A1 Apr. 25, 2024
US 2024/0233403 A9 Jul. 11, 2024

(30) Foreign Application Priority Data

Oct. 19, 2022 (JP) ................................ 2022-167621

(51) Int. Cl.
*G06V 20/56* (2022.01)
*G06V 10/40* (2022.01)
*B60W 60/00* (2020.01)

(52) U.S. Cl.
CPC ............ *G06V 20/588* (2022.01); *G06V 10/40* (2022.01); *B60W 60/00* (2020.02)

(58) Field of Classification Search
None
See application file for complete search history.

(56) References Cited

U.S. PATENT DOCUMENTS

2016/0167669 A1* 6/2016 Zhao ..................... B60W 40/06 382/195
2019/0057261 A1* 2/2019 Tong .................... G06V 10/454
(Continued)

FOREIGN PATENT DOCUMENTS

CN 114861745 A * 8/2022 ............ G06F 18/22
JP 2007-328631 A 12/2007
(Continued)

OTHER PUBLICATIONS

Ali et al., "Normal and risky driving patterns identification in clear and rainy weather on freeway segments using vehicle kinematics trajectories and time series cluster analysis", DOI: https://doi.org/10.1016/j.iatssr.2020.07.002, Publication Year: 2020 (Year: 2020).*
Jhunjhunwala, "A continuously updating k-means algorithm", Publication Year: 2019, https://medium.com/data-science/a-continuously-updating-k-means-algorithm-89584ca7ee63 (Year: 2019).*
Yih et al., "Clustering Algorithms Based on Mahalanobis Distances", DOI: 10.1109/ISECS.2010.57, Publication Yer: 2010 (Year: 2010).*

(Continued)

*Primary Examiner* — Chan S Park
*Assistant Examiner* — Promotto Tajrian Islam
(74) *Attorney, Agent, or Firm* — Dinsmore & Shohl LLP

(57) ABSTRACT

An anomaly detection device includes a processor configured to extract a feature indicating the condition of a road surface by inputting an image representing surroundings of a vehicle into a feature extractor that has been trained to extract the feature, detect an abnormal condition in which the vehicle is unable to travel normally, when the feature is outside a normal range that is a tolerable range in which the vehicle is able to travel normally, and modify the normal range, based on the distribution of normal travel features each indicating the condition of a road surface and extracted from the respective images obtained while the vehicle travels normally.

3 Claims, 7 Drawing Sheets

(56) References Cited

U.S. PATENT DOCUMENTS

| | | | | |
|---|---|---|---|---|
| 2019/0158323 | A1* | 5/2019 | Liu | H04L 25/03343 |
| 2019/0193741 | A1* | 6/2019 | Hitomi | G08G 1/096791 |
| 2021/0004612 | A1* | 1/2021 | Misawa | G06T 7/0002 |
| 2022/0309800 | A1 | 9/2022 | Konishi | |
| 2023/0077516 | A1* | 3/2023 | Bianconcini | G06V 20/56<br>382/104 |

FOREIGN PATENT DOCUMENTS

| | | | |
|---|---|---|---|
| JP | 6448171 | B2 | 1/2019 |
| JP | 2019-082377 | A | 5/2019 |
| JP | 2020-006759 | A | 1/2020 |
| JP | 2022-152359 | A | 10/2022 |

OTHER PUBLICATIONS

FasterCaptital—Cluster Analysis, "Cluster Analysis: Cluster Analysis with a Twist: The Mahalanobis Distance Method", https://www.fastercapital.com/content/Cluster-Analysis--Cluster-Analysis-with-a-Twist--The-Mahalanobis-Distance-Method.html, Publication Year: 2025 (Year: 2025).*

Kenobi, "Mahalanobis distance measure for clustering"—CrossValidated StackExchange, https://stats.stackexchange.com/questions/130287/mahalanobis-distance-measure-for-clustering, Publication Year: 2014 (Year: 2014).*

* cited by examiner

FIG. 6

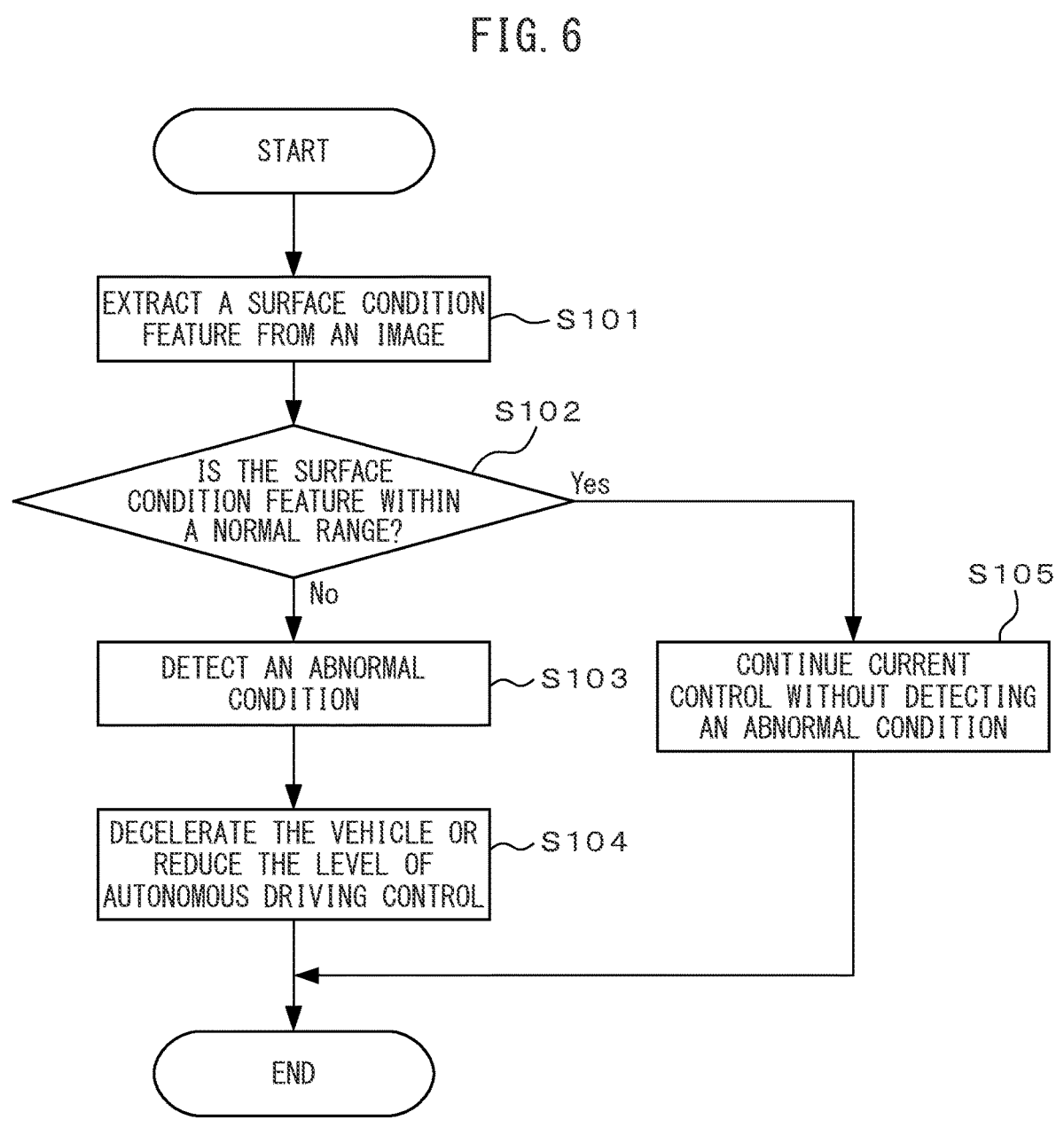

START

EXTRACT A SURFACE CONDITION FEATURE FROM AN IMAGE — S101

IS THE SURFACE CONDITION FEATURE WITHIN A NORMAL RANGE? — S102

Yes

No

DETECT AN ABNORMAL CONDITION — S103

DECELERATE THE VEHICLE OR REDUCE THE LEVEL OF AUTONOMOUS DRIVING CONTROL — S104

CONTINUE CURRENT CONTROL WITHOUT DETECTING AN ABNORMAL CONDITION — S105

END

START
IDENTIFY A NORMAL TRAVEL PERIOD
S201
STORE FEATURES EXTRACTED FROM IMAGES OBTAINED IN THE NORMAL TRAVEL PERIOD AS NORMAL TRAVEL FEATURES
S202
MODIFY THE NORMAL RANGE SO AS TO APPROXIMATE THE DISTRIBUTIONS OF THE REFERENCE FEATURES AND THE NORMAL TRAVEL FEATURES
S203
END

ANOMALY DETECTION DEVICE, ANOMALY DETECTION METHOD, AND COMPUTER PROGRAM FOR DETECTING ANOMALIES

CROSS-REFERENCE TO RELATED APPLICATION

This application claims priority to Japanese Patent Application No. 2022-167621 filed on Oct. 19, 2022, the entire contents of which are herein incorporated by reference.

FIELD

The present disclosure relates to an anomaly detection device, an anomaly detection method, and a computer program for detecting anomalies on the basis of an image representing the surroundings of a vehicle.

BACKGROUND

To execute autonomous driving control of a vehicle safely, it is desirable that the condition of the surface of a road being traveled by the vehicle can be determined. For this purpose, a technique to detect the state of a road surface has been proposed (see Japanese Unexamined Patent Publication JP2019-82377A).

A road state detector described in JP2019-82377A detects the shape of a target road surface, based on distance information indicating the distance between a measurement device and each measurement point on the target road surface, and determines whether a recessed or projecting region in the target road surface, if any, is in an abnormal state. Specifically, the road state detector determines whether the region is in an abnormal state, based on the shape of the region in a normal state. The road state detector determines whether the region is in an abnormal state, by comparing an image obtained by taking a picture of the region with a reference image representing the normal state of the region.

SUMMARY

There may be an obstacle, such as a fallen object, on the path of a vehicle. Such an obstacle may be an object of indefinite color, shape, and size, and thus may not be detected accurately even with a classifier for detecting a predetermined object from an image. This may make it difficult to accurately determine whether the road surface on the path of the vehicle is travelable by the vehicle.

It is an object of the present disclosure to provide an anomaly detection device that can improve the accuracy of detection of anomalies that prevent normal travel of a vehicle.

According to an embodiment, an anomaly detection device is provided. The anomaly detection device includes a processor configured to: extract a feature indicating a condition of a road surface by inputting an image representing surroundings of a vehicle into a feature extractor that has been trained to extract the feature, detect an abnormal condition in which the vehicle is unable to travel normally, when the feature is outside a normal range that is a tolerable range in which the vehicle is able to travel normally, and modify the normal range, based on the distribution of normal travel features each indicating the condition of a road surface and extracted from the respective images obtained while the vehicle travels normally.

In some embodiments, the anomaly detection device further includes a memory configured to store reference features each indicating the condition of a road surface and included in the normal range that is preset. In some embodiments, the processor modifies the normal range so as to approximate the distributions of the reference features and the normal travel features.

According to another embodiment, an anomaly detection method is provided. The anomaly detection method includes extracting a feature indicating a condition of a road surface by inputting an image representing surroundings of a vehicle into a feature extractor that has been trained to extract the feature; detecting an abnormal condition in which the vehicle is unable to travel normally, when the feature is outside a normal range that is a tolerable range in which the vehicle is able to travel normally; and modifying the normal range, based on the distribution of normal travel features each indicating the condition of a road surface and extracted from the respective images obtained while the vehicle travels normally.

According to still another embodiment, a non-transitory recording medium that stores a computer program for detecting anomalies is provided. The computer program includes instructions causing a processor mounted on a vehicle to execute a process including extracting a feature indicating a condition of a road surface by inputting an image representing surroundings of the vehicle into a feature extractor that has been trained to extract the feature; detecting an abnormal condition in which the vehicle is unable to travel normally, when the feature is outside a normal range that is a tolerable range in which the vehicle is able to travel normally; and modifying the normal range, based on the distribution of normal travel features each indicating the condition of a road surface and extracted from the respective images obtained while the vehicle travels normally.

The anomaly detection device according to the present disclosure has an effect of being able to improve the accuracy of detection of anomalies that would prevent normal travel of a vehicle.

BRIEF DESCRIPTION OF DRAWINGS

FIG. 6 is an operation flowchart of the vehicle control process including the anomaly detection process.

DESCRIPTION OF EMBODIMENTS

An anomaly detection device, an anomaly detection method executed by the anomaly detection device, and a computer program for detecting anomalies will now be described with reference to the attached drawings. The anomaly detection device extracts a feature indicating the condition of a road surface by inputting an image representing surroundings of a host vehicle, which is generated by an image capturing unit provided on the vehicle, into a feature extractor. The anomaly detection device determines whether the extracted feature is within a normal range that is a tolerable range in which the vehicle is able to travel normally, and detects an abnormal condition in which the vehicle is unable to travel normally on a host vehicle lane, when the feature is outside the normal range. In addition, the anomaly detection device modifies the normal range so as to approximate the distribution of features extracted from respective images obtained in a predetermined period during which the vehicle is able to travel normally.

The state in which a vehicle is able to travel normally refers to a state in which the vehicle can travel without decelerating at more than a predetermined deceleration or steering by more than a predetermined amount to avoid hitting an obstacle. The obstacle is, for example, a three-dimensional structure that should not exist on the road surface, such as an object fallen on the road surface, or a stepped defect of the road surface, such as a pothole formed in the road surface.

The following describes an example in which the anomaly detection device is applied to a vehicle controller.

Figure 1:
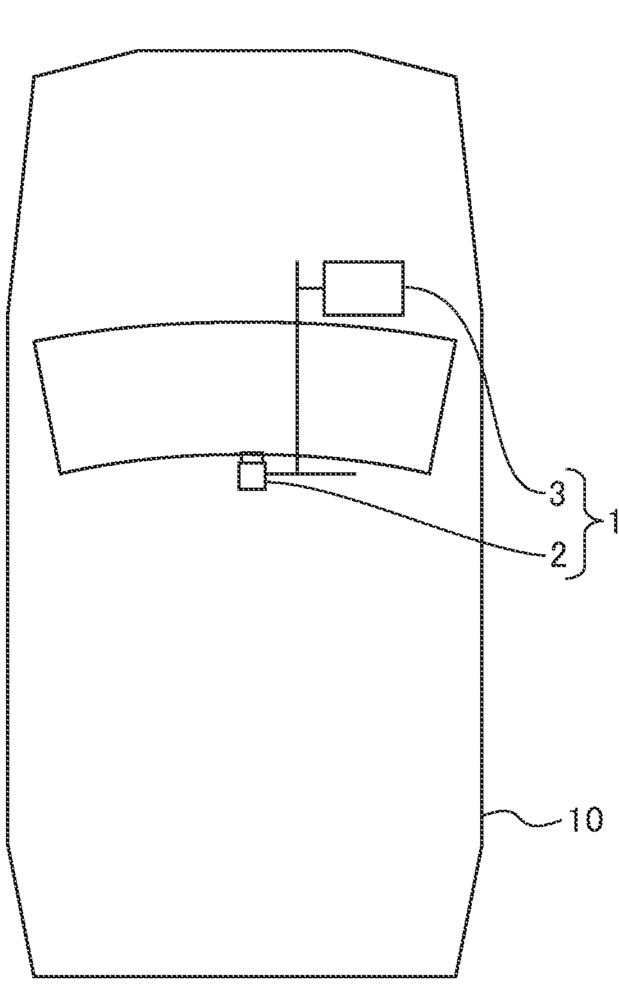
FIG. 1 schematically illustrates the configuration of a vehicle control system equipped with an anomaly detection device.

FIG. 1 schematically illustrates the configuration of a vehicle control system equipped with the anomaly detection device. The vehicle control system 1 is mounted on a vehicle 10 and controls the vehicle 10. To achieve this, the vehicle control system 1 includes a camera 2 and an electronic control unit (ECU) 3, which is an example of the anomaly detection device. The camera 2 is communicably connected to the ECU 3 via an in-vehicle network conforming to a communication standard, such as a controller area network. The vehicle control system 1 may include a range sensor (not illustrated) that measures the distances from the vehicle 10 to objects around the vehicle 10, such as LiDAR or radar. The vehicle control system 1 may further include a measurement device (not illustrated) for measuring the position of the vehicle 10 on the basis of signals from satellites, such as a GPS receiver; a navigation device (not illustrated) for searching for a planned travel route to a destination; and a storage device (not illustrated) that stores map information referred to in autonomous driving control of the vehicle 10.

The camera 2 is an example of the image capturing unit that generates an image representing the surroundings of the vehicle 10. The camera 2 includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented to the front of the vehicle 10. The camera 2 takes pictures of a region in front of the vehicle 10 every predetermined capturing period (e.g., 1/30 to 1/10 seconds), and generates images representing this region. Each image obtained by the camera 2 may be a color or grayscale image. The vehicle 10 may include two or more cameras taking pictures in different orientations or having different focal lengths.

Every time an image is generated, the camera 2 outputs the generated image to the ECU 3 via the in-vehicle network.

The ECU 3 is configured to execute autonomous driving control of the vehicle 10 under a predetermined condition.

Figure 2:
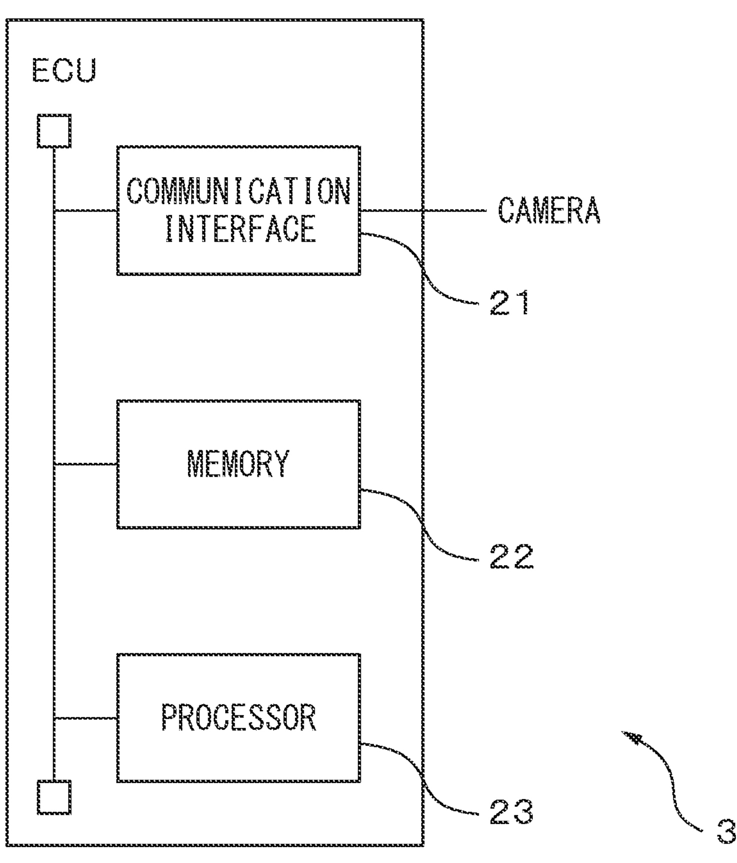
FIG. 2 illustrates the hardware configuration of an electronic control unit, which is an embodiment of the anomaly detection device.

FIG. 2 illustrates the hardware configuration of the ECU 3, which is an example of the anomaly detection device. As illustrated in FIG. 2, the ECU 3 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 3 and the camera 2. Every time an image is received from the camera 2, the communication interface 21 passes the received image to the processor 23.

The memory 22, which is an example of the storage unit, includes, for example, volatile and nonvolatile semiconductor memories, and stores various types of data used in a vehicle control process including an anomaly detection process and executed by the processor 23 of the ECU 3. For example, the memory 22 stores parameters for specifying a classifier used for detecting a path region and a feature extractor used for extracting a feature indicating the condition of a road surface. The memory 22 further stores a preset normal range, reference features included in the preset normal range, and a modified normal range. In addition, the memory 22 temporarily stores images received from the camera 2 and various types of data generated during the vehicle control process, e.g., features obtained during travel of the vehicle 10, which are used for modifying the normal range.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10.

Figure 3:
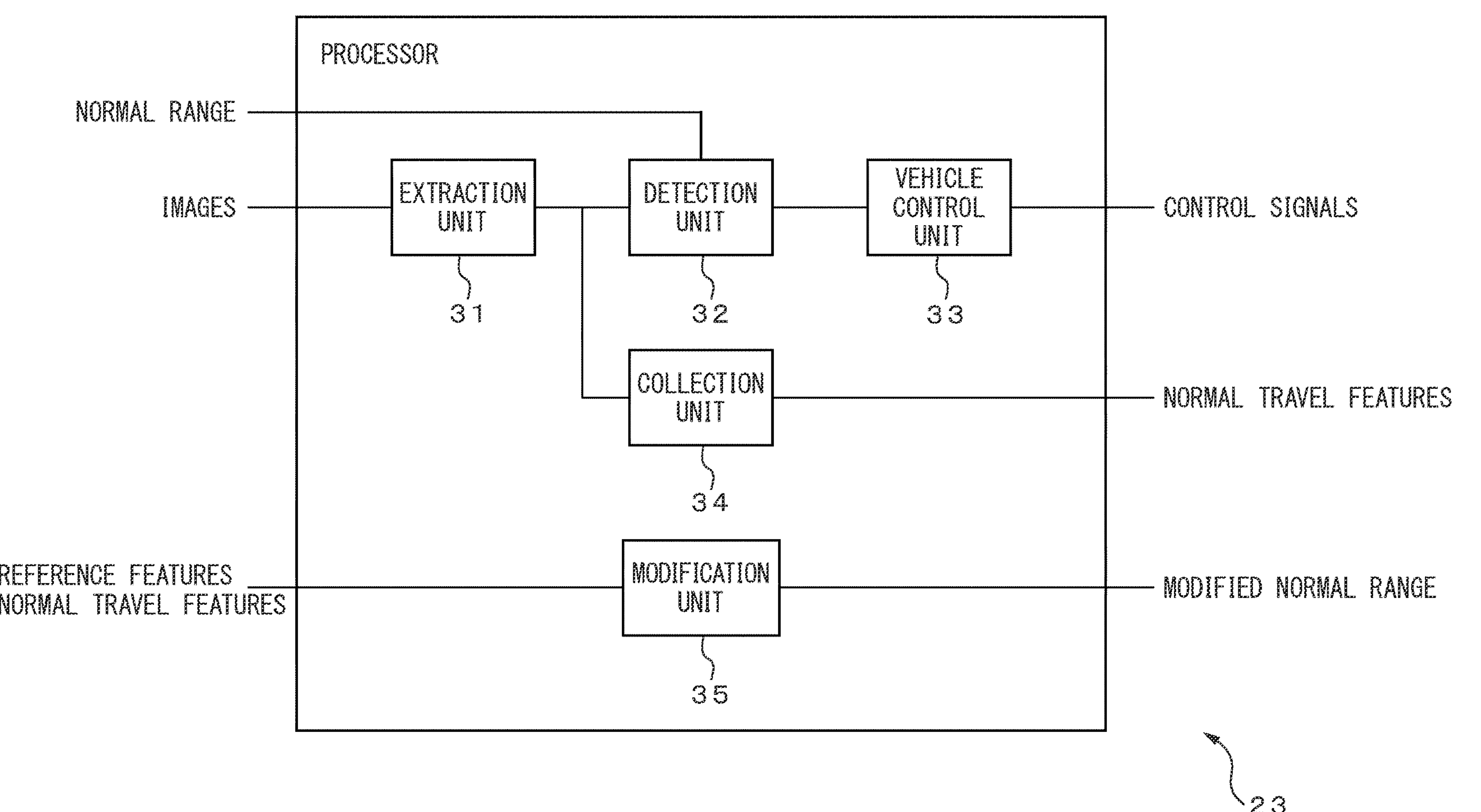
FIG. 3 is a functional block diagram of a processor of the electronic control unit, related to a vehicle control process including an anomaly detection process.

FIG. 3 is a functional block diagram of the processor 23, related to the vehicle control process including an anomaly detection process. The processor 23 includes an extraction unit 31, a detection unit 32, a vehicle control unit 33, a collection unit 34, and a modification unit 35. These units included in the processor 23 are functional modules, for example, implemented by a computer program executed by the processor 23, or may be dedicated operating circuits provided in the processor 23. Of these units, those except the vehicle control unit 33 relate to the anomaly detection process.

The extraction unit 31 extracts a feature indicating the condition of a road surface (this feature will be referred to as a "surface condition feature" below) at predetermined intervals from the latest image received by the ECU 3 from the camera 2. To achieve this, the extraction unit 31 inputs the image into a feature extractor that has been trained to extract a surface condition feature. The feature extractor is configured, for example, by a deep neural network (DNN) having architecture of a convolutional neural network (CNN) type, such as VGG16, VGG19, or ResNet; the DNN includes convolution layers, one or more fully-connected layers closer to the output side than the convolution layers, and an output layer, which executes, for example, a softmax operation. A feature map outputted from the convolution layer closest to the output side (alternatively, the convolution layer closest to the output side and another of the convolution layers closer to the input side than this layer) is used as a surface condition feature outputted by the feature extractor. A surface condition feature outputted by the feature extractor is expressed, for example, as a feature vector having one or more element values.

The feature extractor is trained in advance in accordance with a predetermined training technique, such as backpropagation, with a large number of images each representing some of various types of objects as well as a road surface, so that these objects can be classified. In this way, various types of information represented in an image are condensed into a feature map used as a surface condition feature. This enables the feature extractor to output a surface condition feature indicating the condition of the surface of a road being traveled by the vehicle 10. In other words, the feature extractor can output a surface condition feature having a different value, depending on whether the condition of the surface of a road being traveled by the vehicle 10 is abnormal or normal.

Alternatively, a DNN trained in advance by "unsupervised learning," such as Auto-encoder or Stacked what-where auto-encoders, may be used as the feature extractor. In this case, the feature extractor includes, in order from the input side, an encoder that outputs a feature having a lower dimension than inputted data (in the present embodiment, an image) and a decoder into which the feature outputted from the encoder is inputted. The feature extractor is trained in advance with a large number of images like those described above so that data outputted from the decoder is the same as data inputted into the encoder. By inputting an image into the trained feature extractor, a surface condition feature is obtained as a feature outputted by the encoder. The use of such a feature extractor enables the extraction unit 31 to obtain a surface condition feature appropriately indicating the condition of the surface of a road being traveled by the vehicle 10, even if there is an obstacle of indefinite color, shape, and size in the area captured by the camera 2.

According to a modified example, the extraction unit 31 may identify a path region representing a lane being traveled by the vehicle 10 (hereafter a "host vehicle lane") in an image, and input the identified path region into the feature extractor to extract a surface condition feature. Since this prevents the surroundings of the host vehicle lane from affecting extraction of a surface condition feature, the extraction unit 31 can extract a surface condition feature more appropriately. In this case, the extraction unit 31 identifies a path region by inputting an image obtained from the camera 2 into a classifier that has been trained to identify a path region. As such a classifier, the extraction unit 31 can use a DNN having architecture of a CNN type. More specifically, a DNN for semantic segmentation that identifies, for each pixel, an object represented in the pixel, e.g., a fully convolutional network (FCN) or U-net, is used as the classifier. Alternatively, the extraction unit 31 may use a classifier for semantic segmentation based on a machine learning technique other than a neural network, such as a random forest, as the classifier. The classifier is trained in advance in accordance with a predetermined training technique, such as backpropagation, with a large number of training images representing path regions. The extraction unit 31 determines a set of pixels outputted by the classifier and supposed to represent the host vehicle lane as a path region.

Alternatively, instead of using a classifier like that described above, the extraction unit 31 may detect two lane-dividing lines demarcating the host vehicle lane from an image by image analysis, and determine a region sandwiched between the two detected lane-dividing lines as a path region. In general, a lane-dividing line has a color (white or yellow) brighter than the road surface therearound. Thus, pixels representing a lane-dividing line in an image have greater luminance values than pixels representing the road surface therearound. In view of this, the extraction unit 31 extracts pixels having luminance values not less than a predetermined value in an area supposed to represent the road surface in an image. Alternatively, the extraction unit 31 may extract a pixel having a greater luminance value of two pixels adjacent in the horizontal direction between which the difference in luminance is not less than a predetermined threshold. The extraction unit 31 then detects individual lane-dividing lines by approximating sets of extracted pixels with straight lines, and determines the lane-dividing lines closest to the center of the image in the left and right sides of the image as the lane-dividing lines demarcating the host vehicle lane.

When the feature extractor extracts a surface condition feature based only on a path region in an image, the extraction unit 31 substitutes a predetermined value for each pixel value of the image except the path region to mask the outside of the path region. The extraction unit 31 inputs the image in which the outside of the path region is masked into the feature extractor. Alternatively, the extraction unit 31 may cut a path region out of an image, and input the cutout path region into the feature extractor. In this case, the extraction unit 31 may execute pre-processing, such as upsampling, downsampling, or padding, on the cutout path region so that the cutout path region has a predetermined shape and size. The extraction unit 31 may then input the preprocessed path region into the feature extractor. Since this makes the shape and size of the path region inputted into the feature extractor be uniform, the feature extractor can be simplified.

The extraction unit 31 passes the extracted surface condition feature to the detection unit 32.

The detection unit 32 determines whether the surface condition feature received from the extraction unit 31 is within a normal range read from the memory 22. The normal range is a tolerable range of the surface condition feature in which the vehicle 10 is able to travel normally, as described above. The detection unit 32 uses a preset normal range prestored in the memory 22 until modification of the normal range by the modification unit 35, and uses a modified normal range after modification of the normal range by the modification unit 35. When the surface condition feature extracted by the extraction unit 31 is outside the normal range, the detection unit 32 detects an abnormal condition in which the vehicle 10 is unable to travel normally on the host vehicle lane. When the surface condition feature is within the normal range, the detection unit 32 does not detect such an abnormal condition.

The detection unit 32 notifies the vehicle control unit 33 of the result of determination whether an abnormal condition is detected.

When notified by the detection unit 32 that an abnormal condition is detected, the vehicle control unit 33 controls components of the vehicle 10 so that the abnormal condition may not pose a danger to the vehicle 10. For example, when notified that an abnormal condition is detected, the vehicle control unit 33 decelerates the vehicle 10 at a predetermined deceleration.

The vehicle control unit 33 sets the degree of accelerator opening or the amount of braking so as to decelerate at the set deceleration. The vehicle control unit 33 then determines the amount of fuel injection according to the set degree of accelerator opening, and outputs a control signal depending on the amount of fuel injection to a fuel injector of an engine of the vehicle 10. Alternatively, the vehicle control unit 33 controls a power supply of a motor for driving the vehicle 10 so that electric power depending on the set degree of accelerator opening is supplied to the motor. Alternatively, the vehicle control unit 33 outputs a control signal depending on the set amount of braking to the brakes of the vehicle 10.

In addition, the vehicle control unit 33 may notify the driver of a warning that an abnormal condition is detected, via a notification device provided in the interior of the vehicle 10. For example, when a display is provided as an example of the notification device, the vehicle control unit 33 causes a warning message or an icon indicating that an abnormal condition is detected to appear on the display. When a speaker is provided as another example of the notification device, the vehicle control unit 33 causes the speaker to output a warning voice saying that an abnormal condition is detected. When a vibrator is provided in the driver's seat or steering as still another example of the notification device, the vehicle control unit 33 causes vibration of the vibrator. When one or more light sources are provided as yet another example of the notification device, the vehicle control unit 33 causes a light source corresponding to detection of an abnormal condition among the light sources to light up or blink. When multiple notification devices are provided in the vehicle interior, the vehicle control unit 33 may give notification of a warning that an abnormal condition is detected, via two or more of the notification devices.

Alternatively, the vehicle control unit 33 may reduce the level of autonomous driving control applied to the vehicle 10. For example, when "level 3" autonomous driving control defined by the Society of Automotive Engineers (SAE) is applied to the vehicle 10, the vehicle control unit 33 reduces the level of autonomous driving control applied to the vehicle 10 to one of levels 0 to 2. When level 2 autonomous driving control is applied to the vehicle 10, the vehicle control unit 33 reduces the level of autonomous driving control applied to the vehicle 10 to level 0 or 1. Alternatively, the vehicle control unit 33 may request the driver of the vehicle 10 to hold the steering wheel. In this case also, the vehicle control unit 33 notifies the driver that the level of autonomous driving control will be changed, via the notification device provided in the interior of the vehicle 10. More specifically, when a display is provided as an example of the notification device, the vehicle control unit 33 causes a notification message or an icon indicating a change of the level of applied autonomous driving control and the level after the change to appear on the display. When a speaker is provided as another example of the notification device, the vehicle control unit 33 causes the speaker to output a notification voice saying about a change of the level of applied autonomous driving control and the level after the change. When a vibrator is provided in the driver's seat or steering as still another example of the notification device, the vehicle control unit 33 vibrates the vibrator in a mode corresponding to the level of autonomous driving control to be applied. When one or more light sources are provided as yet another example of the notification device, the vehicle control unit 33 causes a light source corresponding to the level of autonomous driving control after the change among the light sources to light up or blink. When multiple notification devices are provided in the vehicle interior, the vehicle control unit 33 may make notification of a change of the level of applied autonomous driving control via two or more of the notification devices.

Alternatively, the vehicle control unit 33 may only notify the driver of a warning that an abnormal condition is detected, via the notification device provided in the vehicle interior, without decelerating the vehicle 10 and without changing the level of applied autonomous driving control.

The collection unit 34 collects individual features extracted by the extraction unit 31 from respective images generated by the camera 2 while the vehicle 10 is able to travel normally, as normal travel features to be used for modifying the normal range. In the following, a period during which the vehicle 10 is able to travel normally will be referred to as a "normal travel period." The normal travel period is set so as to have a predetermined length, for example, between several seconds to a dozen or so seconds.

For example, the collection unit 34 identifies a normal travel period in a period during which the driver manually drives the vehicle 10 before application of autonomous driving control to the vehicle 10 (hereafter a "manual driving period"), based on sensor signals indicating motion of the vehicle 10. A sensor signal indicating motion of the vehicle 10 may be, for example, one indicating the acceleration or deceleration of the vehicle 10 or the steering angle of the vehicle 10. Specifically, the collection unit 34 obtains measured values of the acceleration or deceleration of the vehicle 10 in the manual driving period from an acceleration sensor (not illustrated) mounted on the vehicle 10. In addition, the collection unit 34 obtains measured values of the steering angle of the vehicle 10 in the manual driving period from a steering angle sensor (not illustrated) mounted on the vehicle 10. The collection unit 34 then determines a period that is longer than the predetermined length and during which the absolute value of the maximum of the acceleration or deceleration of the vehicle 10 is kept less than a predetermined deceleration threshold and the maximum of the steering angle of the vehicle 10 is kept less than a predetermined steering angle threshold, as a normal travel period.

The collection unit 34 determines individual features extracted by the extraction unit 31 from respective images generated by the camera 2 in the normal travel period as normal travel features. The collection unit 34 stores the normal travel features in the memory 22.

The modification unit 35 modifies the preset normal range after the normal travel period so that this normal range approximates the distribution of normal travel features, thereby determining a modified normal range. For example, the modification unit 35 reads reference features and normal travel features from the memory 22, and calculates an average of the read features and the Euclidean distance from the average to the farthest of the features. The modification unit 35 determines a range centered at the calculated average and having a radius of the calculated Euclidean distance as a modified normal range. Alternatively, the modification unit 35 calculates an average of the normal travel features and the Euclidean distance from the average of the normal travel features to the farthest of the normal travel features. The modification unit 35 may determine the modified normal range by adding a range centered at the calculated average of the normal travel features and having a radius of the calculated Euclidean distance as one of normal ranges.

Alternatively, the modification unit 35 may approximate the distribution of features including the reference features and the normal travel features with a probabilistic model, such as a normal distribution or a mixture Gaussian distribution. To this end, the modification unit 35 determines parameters of a probabilistic model approximating the distribution of the features in accordance with a maximum likelihood method, such as expected value maximization. The modification unit 35 then determines a range in the probabilistic model within a predetermined Mahalanobis distance (e.g., 2 to 3) of the position at which the probability is a local maximum (in the case where the probabilistic model is a normal distribution, the average of the normal distribution; in the case of a contaminated normal distribution, an average of a normal distribution included in the contaminated normal distribution) as a modified normal range.

In the manner described above, the modification unit 35 can change the normal range to a more appropriate range, according to the condition of the road being traveled by the vehicle 10.

Figure 4:
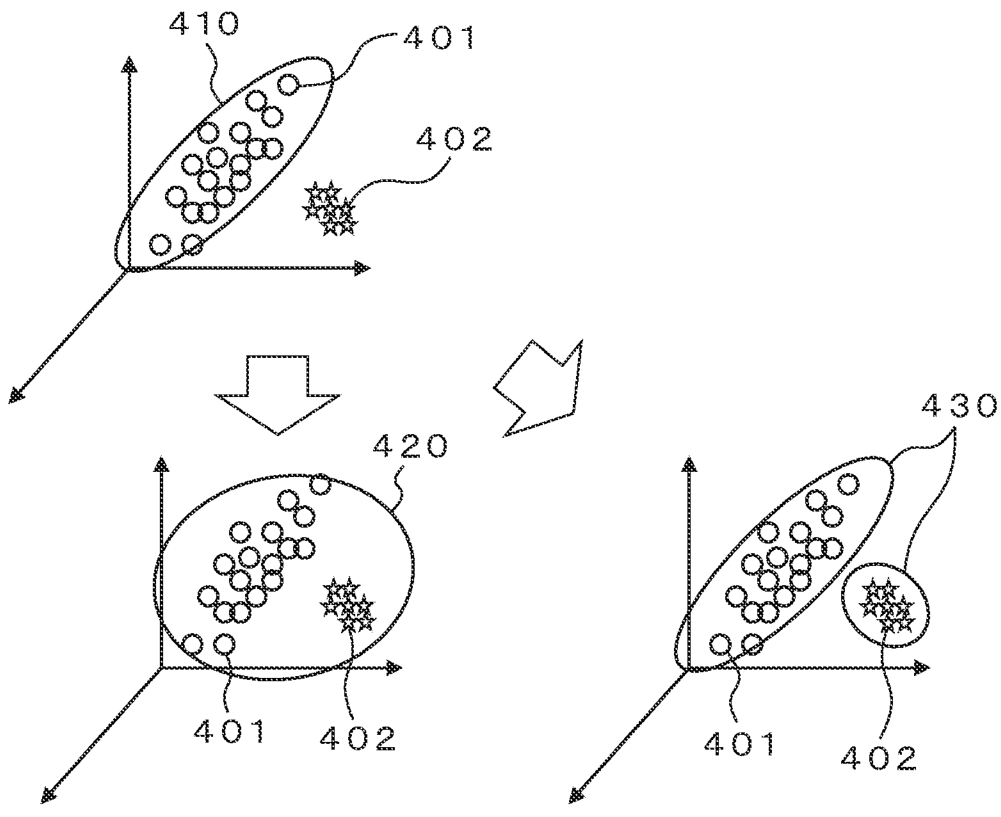
FIG. 4 is a diagram for explaining an example of modification of a normal range according to the embodiment.

FIG. 4 is a diagram for explaining an example of modification of the normal range according to the present embodiment. In FIG. 4, individual circles 401 and stars 402 represent reference features and normal travel features, respectively. FIG. 4 illustrates three-dimensional features for the sake of convenience, but the dimension of the features (i.e., the number of elements included in each feature) may be less than or more than three.

A preset normal range 410 includes the distribution of the reference features 401 and excludes features outside this distribution. However, the distribution of the normal travel features 402 obtained in a normal travel period during which the vehicle 10 is able to travel normally does not match the distribution of the reference features 401. Thus the normal range is modified so as to approximate the distributions of the reference features 401 and the normal travel features 402. Specifically, a modified normal range 420 is determined as illustrated, which is a single area including the distributions of the reference features 401 and the normal travel features 402. Alternatively, a modified normal range 430 may be provided as illustrated, which is composed of separate areas respectively including the distributions of the reference features 401 and the normal travel features 402. In the example illustrated in FIG. 4, the normal range is modified so as to include the distribution of the normal travel features 402, which results in the modified normal range larger than the preset normal range.

Figure 5:
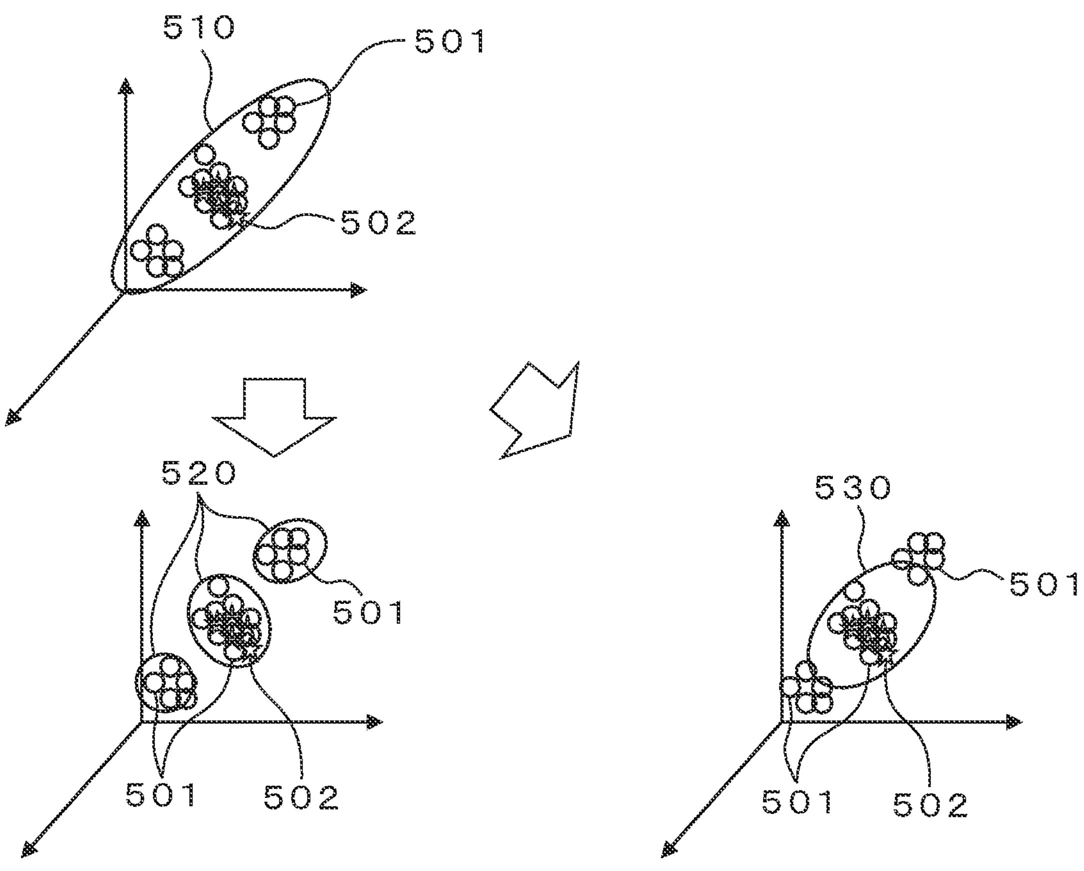
FIG. 5 is a diagram for explaining another example of modification of a normal range according to the embodiment.

FIG. 5 is a diagram for explaining another example of modification of the normal range according to the present embodiment. In FIG. 5, individual circles 501 and stars 502 represent reference features and normal travel features, respectively. FIG. 5 illustrates three-dimensional features for the sake of convenience, similarly to FIG. 4, but the dimension of the features may be less than or more than three.

In the example illustrated in FIG. 5, a preset normal range 510 also includes the distribution of the reference features 501 and excludes features outside this distribution. In this example, the normal travel features 502 obtained in a normal travel period during which the vehicle 10 is able to travel normally are distributed only in part of the preset normal range 510. Thus, a modified normal range 520 is set, which is composed of multiple areas, so as to approximate the distributions of the individual reference features 501 and the individual normal travel features 502 more appropriately. Alternatively, the normal range may be modified so as to include only an area where the reference features 501 and the normal travel features 502 are concentrated, like a modified normal range 530. In the example illustrated in FIG. 5, the normal range is modified so as to include the distribution of the normal travel features 502, which results in the modified normal range smaller than the preset normal range.

FIG. 6 is an operation flowchart of the vehicle control process including the anomaly detection process and executed by the processor 23. The processor 23 executes the vehicle control process at predetermined intervals in accordance with the operation flowchart described below.

The extraction unit 31 of the processor 23 extracts a surface condition feature from the latest image obtained by the camera 2 (step S101). The detection unit 32 of the processor 23 determines whether the surface condition feature is within a normal range (step S102). When the surface condition feature is outside a normal range (No in step S102), the detection unit 32 detects an abnormal condition in which the vehicle 10 is unable to travel normally (step S103). The vehicle control unit 33 of the processor 23 decelerates the vehicle 10 or reduces the level of autonomous driving control applied to the vehicle 10 so that the detected abnormal condition may not pose a danger to the vehicle 10 (step S104).

When the surface condition feature is within a normal range in step S102 (Yes in step S102), the detection unit 32 does not detect an abnormal condition in which the vehicle 10 is unable to travel normally. The vehicle control unit 33 continues control of the vehicle 10 currently applied to the vehicle 10 (step S105).

After step S104 or S105, the processor 23 terminates the vehicle control process.

Figure 7:
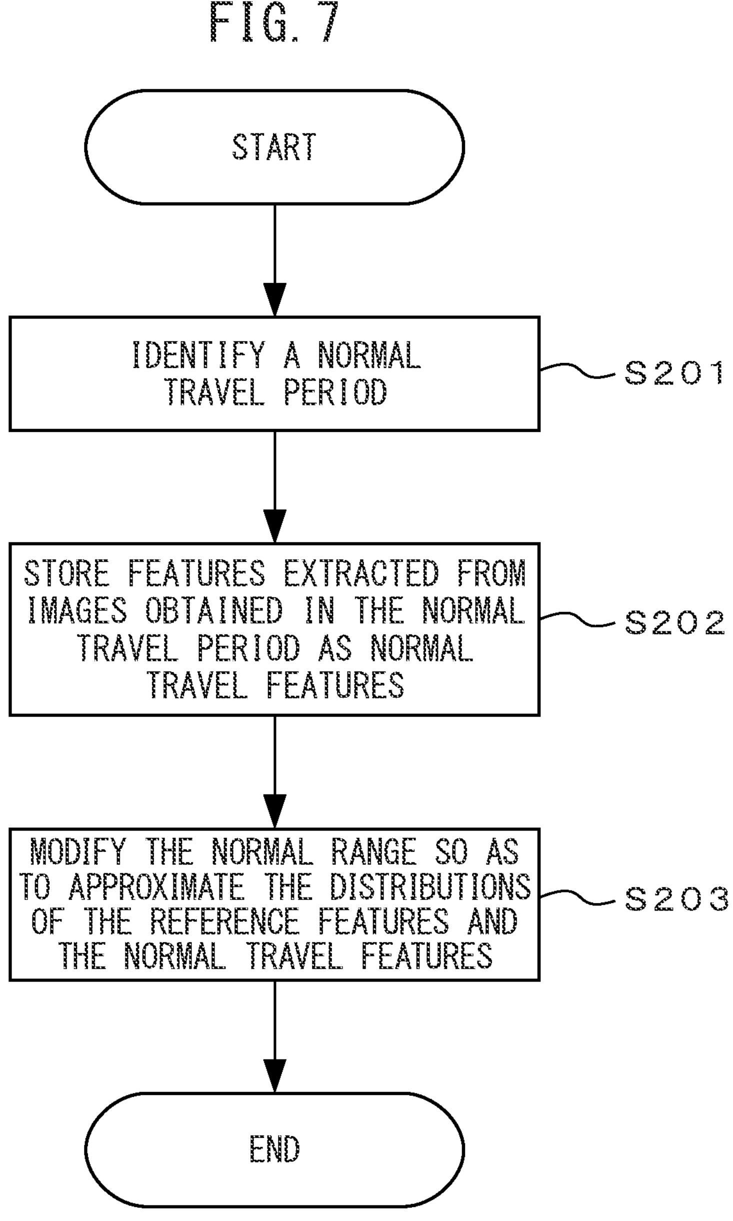
FIG. 7 is an operation flowchart of processing related to modification of a normal range in the anomaly detection process.

FIG. 7 is an operation flowchart of processing related to modification of the normal range in the anomaly detection process and executed by the processor 23. The processor 23 executes the processing related to modification of the normal range in accordance with the operation flowchart described below before application of autonomous driving control to the vehicle 10.

The collection unit 34 of the processor 23 identifies a normal travel period during which the vehicle 10 is able to travel normally, based on sensor signals indicating motion of the vehicle 10 (step S201). The collection unit 34 stores individual features extracted by the extraction unit 31 from respective images generated by the camera 2 in the normal travel period, in the memory 22 as normal travel features (step S202).

The modification unit 35 of the processor 23 reads reference features and normal travel features from the memory 22, and modifies the normal range so as to approximate the distributions of these features (step S203). After step S203, the processor 23 terminates the processing related to modification of the normal range.

As has been described above, the anomaly detection device extracts a surface condition feature by inputting an image representing surroundings of a host vehicle, which is generated by an image capturing unit provided on the vehicle, into a feature extractor. The anomaly detection device determines whether the extracted surface condition feature is within a normal range in which the vehicle is able to travel normally, and detects an abnormal condition in which the vehicle is unable to travel normally on a host vehicle lane, when the feature is outside the normal range. In addition, the anomaly detection device modifies the normal range so as to approximate the distribution of features extracted from respective images obtained in a normal travel period. Since the normal range is adjusted in this way according to the conditions of roads actually traveled by the vehicle, the anomaly detection device can improve the accuracy of detection of anomalies that prevent normal travel of a vehicle.

The computer program for achieving the functions of the processor 23 of the ECU 3 according to the embodiment or modified examples may be provided in a form recorded on a computer-readable portable storage medium, such as a semiconductor memory, a magnetic medium, or an optical medium.

As described above, those skilled in the art may make various modifications according to embodiments within the scope of the present disclosure.

What is claimed is:

1. An anomaly detection device comprising:

a memory configured to store reference features; and a processor configured to:

identify a normal travel period during which a vehicle is able to travel normally, based on sensor signals indicating motion of the vehicle, extract a normal travel feature indicating a condition of a road surface by inputting an image representing surroundings of the vehicle into a feature extractor that has been trained to extract the normal travel feature, determine whether an abnormal condition, in which the vehicle is unable to travel normally, is present, when the normal travel feature is outside a normal range that is a tolerable range in which the vehicle is able to travel normally, and in response to determining that the normal travel feature is outside the normal range, modify the normal range, based on a distribution of normal travel features each indicating the condition of the road surface and extracted from the respective images obtained while the vehicle travels normally, wherein each of the reference features represents a preset normal condition of the road surface, wherein a preset normal range is determined based on the reference features, wherein each of the normal travel features is extracted by the feature extractor, and wherein the processor is further configured to:

modify the normal range to approximate the distributions of the reference features and the normal travel features with a predetermined probabilistic model; and modify the normal range such that the modified normal range associated with the reference features and the normal travel features exhibits a maximum probability within a predetermined Mahalanobis distance.

2. An anomaly detection method, comprising:

identifying a normal travel period during which a vehicle is able to travel normally, based on sensor signals indicating motion of the vehicle, extracting a normal travel feature indicating a condition of a road surface by inputting an image representing surroundings of the vehicle into a feature extractor that has been trained to extract the normal travel feature;

determining whether an abnormal condition, in which the vehicle is unable to travel normally, is present, when the normal travel feature is outside a normal range that is a tolerable range in which the vehicle is able to travel normally, and in response to determining that the normal travel feature is outside the normal range, modifying the normal range, based on a distribution of normal travel features each indicating the condition of the road surface and extracted from the respective images obtained while the vehicle travels normally, wherein each of the reference features represents a preset normal condition of the road surface and a preset normal range is determined based on the reference features, wherein each of the normal travel features is extracted by the feature extractor, wherein the method further comprises:

modifying the normal range to approximate the distributions of the reference features and the normal travel features with a predetermined probabilistic model; and modifying the normal range such that the modified normal range associated with the reference features and the normal travel features exhibits a maximum probability within a predetermined Mahalanobis distance.

3. A non-transitory recording medium that stores a computer program for detecting anomalies, the computer program causing a processor mounted on a vehicle to execute a process comprising:

identifying a normal travel period during which a vehicle is able to travel normally, based on sensor signals indicating motion of the vehicle, extracting a normal travel feature indicating a condition of a road surface by inputting an image representing surroundings of the vehicle into a feature extractor that has been trained to extract the normal travel feature;

determining whether an abnormal condition, in which the vehicle is unable to travel normally, is present, when the normal travel feature is outside a normal range that is a tolerable range in which the vehicle is able to travel normally, and in response to determining that the normal travel feature is outside the normal range, modifying the normal range, based on a distribution of normal travel features each indicating the condition of the road surface and extracted from the respective images obtained while the vehicle travels normally, wherein each of the reference features represents a preset normal condition of the road surface and a preset normal range is determined based on the reference features, and wherein each of the normal travel features is extracted by the feature extractor, and wherein the process further comprises:

modifying the normal range to approximate the distributions of the reference features and the normal travel features with a predetermined probabilistic model; and modifying the normal range such that the modified normal range associated with the reference features and the normal travel features exhibits a maximum probability within a predetermined Mahalanobis distance.

* * * * *